Nov. 10, 1964   C. MARTIN   3,156,008
RELEASE MECHANISM FOR AUTOMATIC MOLDING MACHINE
Filed Jan. 13, 1964   2 Sheets-Sheet 1
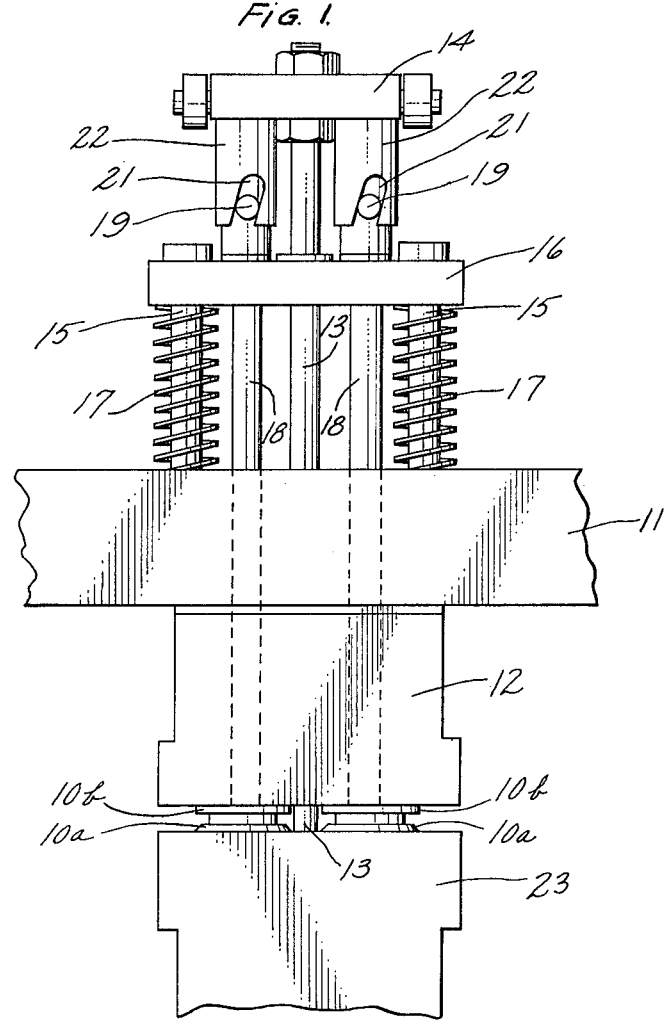
Inventor:
Cecil Martin
by Allard A. Braddock
His Attorney Nov. 10, 1964     C. MARTIN     3,156,008
RELEASE MECHANISM FOR AUTOMATIC MOLDING MACHINE
Filed Jan. 13, 1964     2 Sheets-Sheet 2
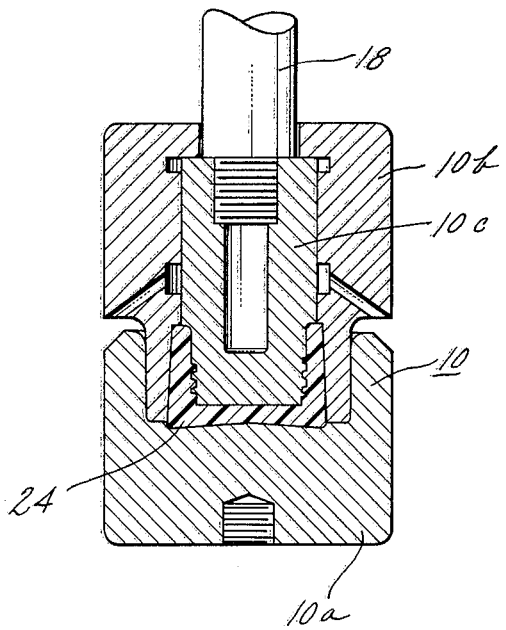
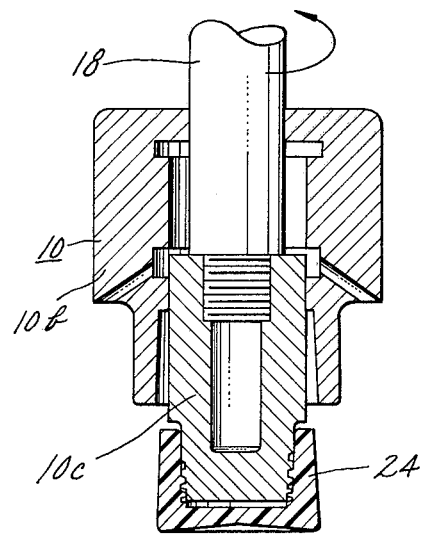
Inventor:
Cecil Martin
by Allard A. Braddock
His Attorney

United States Patent Office 3,156,008
Patented Nov. 10, 1964

3,156,008
RELEASE MECHANISM FOR AUTOMATIC MOLDING MACHINE
Cecil Martin, Cranston, R.I., assignor to General Electric Company, a corporation of New York
Filed Jan. 13, 1964, Ser. No. 337,990
1 Claim. (Cl. 18—2)

This invention relates to a release mechanism for an automatic molding machine; more particularly, the invention relates to a molding machine release mechanism which applies both a rotational force and a longitudinal force to release a molded plastic article from a mold.

The present invention, which is a continuation-in-part application of our original application Serial No. 123,699 which was filed on July 13, 1961, now abandoned, is directed particularly to a release mechanism for attachment to a continuous rotary molding machine of the type disclosed in Benander et al. Patent No. 2,471,139. Briefly, the Benander machine provides means for continuously and automatically opening a series of molds positioned around the perimeter of a circular table, ejecting a molded item from the mold and directing it to a receptacle, measuring out a correct amount of molding powder, transferring the measured-out amount to the cavity of the mold, closing the mold, and applying heat and pressure to convert the molding powder to a cured final product. While the Benander machine included an ejector mechanism, the mechanism was capable of reciprocal motion only in a longitudinal direction. This motion is sufficient to eject most molded shapes but will not release a molded article having internal threads, e.g., a bottle cap.

The present invention has as one of its objects to provide a release attachment for an automatic molding machine which will release a workpiece having internal threads.

Another object of the invention is to provide a release attachment in which the ejector rod is given first rotational movement and then longitudinal movement.

Other objects of the invention will be apparent from the following specification taken in conjunction with the drawings wherein FIG. 1 is a broken view of a section of molding machine showing two ejector mechanisms in accordance with the present invention;

FIG. 2 is a sectional view of a mold after curing of the workpiece but before operation of the ejector mechanism; and FIG. 3 is a sectional view of a portion of the mold illustrated in FIG. 2 after the ejector mechanism of this invention has been operated.

Briefly stated, in accordance with one of its aspects, the present invention is directed to an automatic molding machine having an ejector rod longitudinally movable through a mold aperture to release a molded workpiece from the mold and means for applying a torque to the ejector rod prior to the longitudinal movement thereof in order to release a workpiece from a core mounted upon the ejector rod.

FIG. 1 illustrates a section of a rotary molding machine of the Benander type with the attachment of the present invention. A pair of molds 10a and 10b are shown in the position they assume after a molded article has been cured but before the article has been released from the molds. A top plate 11 has an upper mold holder 12 positioned on its underside in which is mounted the upper portions of the molds 10. A vertical rod 13 extending upward through the top plate 11 is connected by one end to the end of rocker arm 14, and the other end of rod 13 to the lower mold 23. Reciprocating motion is imparted to rod 13 when the lower mold mounting 23 travels downward on the opening of the mold. Mounted on the top plate 11 are a pair of guide rods 15 which serve as retainers for a yoke 16 slidably mounted upon the guide rods 15 and maintained in position against their ends by means of the bias of a pair of coil springs 17.

The yoke 16 serves to position a pair of knockout or ejector rods 18 which pass through the yoke and are free to rotate with respect thereto. The upper ends of the ejector rods 18 are equipped with one or more embossments 19 positioned to engage the walls of spiral channels 21 of sleeves 22 mounted upon the end of the rocker arm 14. Thus, as the rocker arm 14 describes a vertical downward movement from the position illustrated in FIG. 1, a lower mold holder 23 is moved downward to separate the lower mold 10 from the upper mold 10. The sleeves 22 also move downward and the engagement of the embossments 19 by the sides of the spiral channels 21 rotates the ejector rods 18 slightly. As the bottom portion of the channels 21 engages the embossments 19, further movement of the rocker arm 14 produces movement of core pieces 10c mounted upon the ends of the ejectors 18 with respect to the upper portions 10b of the molds in a manner to be described more specifically with reference to FIGS. 2 and 3.

FIG. 2 is a sectional view of a mold 10 consisting of the lower mold 10a, upper mold 10b, and mold core piece 10c. The core piece 10c is mounted upon the ejector rod 18 by means of a left-hand thread in order for the core piece to remain fixedly mounted upon the ejector rod when the rod is rotated as a result of the embossments 19 engaging the sides of the spiral channels 21. A workpiece 24 consisting of a plastic bottle cap having internal threads is shown in FIG. 2 in the position it would occupy after cure but before separation from the mold.

The operation of the present invention will now be described with reference to FIG. 3. The first result of the opening of the mold is to lower the mold holder 23 and the bottom portion 10a of the mold thus breaking the bottom portion free of what will ultimately be the top portion of the bottle cap 24. Further descent imparts motion by rod 13 to the rocker arm 14 which rotates the ejector rod 18 in the direction indicated by the arrow in FIG. 3. This breaks loose the core piece 10c from the threaded interior portion of the bottle cap 24. The final descent of the rocker arm 14 produces longitudinal movement of the ejector rod 18 which breaks loose the exterior sides of the bottle cap 24 from the upper mold 10b. The bottle cap 24 remains mounted on the core piece 10c but is now ready to be spun off without the expenditure of significant force.

It can be seen that without the rotational movement applied to the ejector rod 18, the workpiece 24 would remain in tight engagement with the core piece 10c and in view of the area of engagement, a great deal of torque would have to be exerted against the workpiece in order to break it loose from the core piece 10c. This could not be accomplished without the application of considerable force with an accompanying injurious effect upon the workpiece.

While the invention has been described with reference to a specific embodiment thereof, it is obvious that there can be variations which still fall within the true spirit of the invention. Accordingly, the invention should be limited in scope only as may be necessitated by the scope of the appended claims.

In the interpretation of these claims it will be evident that an important relationship of the mold parts, upon which successful operation of my apparatus depends, is the holding action of the upper mold part on the outer wall surface of the molded article at the time the rotational force is applied to the core internally of the molded part, i.e., to release the core part from the inner surface of the molded part. It is only by having the upper mold part 10b serve as the shape defining member of the outer wall and by having the lower mold part 23 serve primarily as a mold cavity closure member that the essential relation between the upper mold part and core part 10c can permit the sequential release of parts to be followed as described above. By this sequence the lower mold or mold cavity closure part is released first, the threaded core part is released second and the outer mold surface is released last.

It is only as a result of this sequence that the core part is released prior to the outer annular surface and the entire cap can thus be freed from the mold without marring any of its surfaces. In part the attainment of this sequence can be enhanced by employing a higher pitch to the spiral channel 21 so that the rotational force on member 18 is in excess of the ejector force operating along the rod.

What is claimed is as follows:

1. In an automatic compression molding machine, a mold having an upper cavitated part and a lower closure part defining a shaped cavity, means for engaging and disengaging the lower mold with respect to the upper mold,
a threaded core piece having reciprocal movement in said upper mold and defining therewith an annular portion of said cavity,
an ejector rod on which said core piece is mounted,
an embossment mounted on said ejector rod at a point removed from said core piece,
and means for imparting reciprocal and slight rotational movement to said ejector rod,
said means including a reciprocally moving sleeve with a spiral channel in which said embossment is positioned,
said spiral channel being of a length and pitch to impart first a rotative force to said core piece to break loose the threads of said core piece from a workpiece positioned in the mold cavity and then an ejector force to break the workpiece free from other surfaces of said upper mold.

References Cited in the file of this patent
UNITED STATES PATENTS

| | | |
|---|---|---|
| 1,944,571 | Rohm | Jan. 23, 1934 |
| 1,959,612 | Burke | May 22, 1934 |
| 2,363,808 | Sayre | Nov. 28, 1944 |
| 2,391,527 | Tracy | Dec. 25, 1945 |
| 2,899,705 | Darlington | Aug. 18, 1959 |
| 2,984,862 | Chabotte | May 23, 1961 |